(12) United States Patent
Grossman et al.

(10) Patent No.: US 10,684,768 B2
(45) Date of Patent: Jun. 16, 2020

(54) ENHANCED TARGET SELECTION FOR A TOUCH-BASED INPUT ENABLED USER INTERFACE

(75) Inventors: Tovi Grossman, Toronto (CA); George Fitzmaurice, Toronto (CA); Xing-Dong Yang, Edmonton (CA); Pourang Polad Irani, Winnipeg (CA)

(73) Assignee: Autodesk, Inc., San Rafael, CA (US)

( * ) Notice: Subject to any disclaimer, the term of this patent is extended or adjusted under 35 U.S.C. 154(b) by 371 days.

(21) Appl. No.: 13/274,253

(22) Filed: Oct. 14, 2011

(65) Prior Publication Data

US 2013/0097550 A1 Apr. 18, 2013

(51) Int. Cl.
*G06F 3/0488* (2013.01)

(52) U.S. Cl.
CPC .................. *G06F 3/0488* (2013.01)

(58) Field of Classification Search
CPC ... G06F 2203/0331; G06F 2203/04805; G06F 3/0488
USPC ................. 715/779, 865, 831, 703
See application file for complete search history.

(56) References Cited

U.S. PATENT DOCUMENTS

| | | | | |
|---|---|---|---|---|
| 5,579,037 A | * | 11/1996 | Tahara | ............ G06F 3/0488 345/173 |
| 6,232,957 B1 | * | 5/2001 | Hinckley | ................. 345/156 |
| 6,286,104 B1 | * | 9/2001 | Buhle et al. | ................. 726/4 |
| 6,683,627 B1 | * | 1/2004 | Ullmann et al. | .......... 715/786 |
| 7,730,401 B2 | | 6/2010 | Gillespie et al. | |
| 7,847,786 B2 | | 12/2010 | Schobben et al. | |
| 8,018,441 B2 | * | 9/2011 | Shin et al. | ................. 345/173 |
| 8,074,181 B2 | * | 12/2011 | Zaman et al. | ............ 715/784 |

(Continued)

FOREIGN PATENT DOCUMENTS

| | | |
|---|---|---|
| CN | 1666247 A | 9/2005 |
| CN | 101356492 A | 1/2009 |

(Continued)

OTHER PUBLICATIONS

Anonymous, Method for a touch based dynamic GUI, Jun. 17, 2002, IP.com prior art database technical disclosure, IPCOM000008489D, 5 pgs.*

(Continued)

*Primary Examiner* — Sherief Badawi
*Assistant Examiner* — Wendy Nicholas
(74) *Attorney, Agent, or Firm* — Artegis Law Group, LLP

(57) ABSTRACT

Systems and methods for providing graphical user interface elements optimized for touch-based input in connection with an application that is designed for conventional input received from a keyboard and a mouse. The touch-based graphical user interface elements are displayed when the computer system detects that a user is about to switch from conventional input devices to touch-sensitive input devices. The touch-based graphical user interface elements are hidden when the user provides input with the conventional input devices such that the touch-based graphical user interface elements do not distract from the applications normal operation. The display device includes a sensing capability that enables the computer system to detect when an object, such as a user's finger or a stylus, is proximate to, but not in contact with, the display device.

10 Claims, 14 Drawing Sheets

(56) References Cited

U.S. PATENT DOCUMENTS

| | | | |
|---|---|---|---|
| 8,209,628 B1* | 6/2012 | Davidson | G06F 3/0487 715/790 |
| 8,413,066 B2* | 4/2013 | Lysytskyy et al. | 715/773 |
| 8,819,584 B2* | 8/2014 | Numazaki | 715/800 |
| 2006/0022955 A1* | 2/2006 | Kennedy | G06F 3/0414 345/173 |
| 2006/0209016 A1* | 9/2006 | Fox | G06F 3/038 345/156 |
| 2007/0057911 A1* | 3/2007 | Fateh | 345/156 |
| 2007/0130535 A1* | 6/2007 | DeMaio et al. | 715/779 |
| 2007/0288860 A1* | 12/2007 | Ording | G06F 3/04842 715/779 |
| 2008/0104520 A1* | 5/2008 | Swenson et al. | 715/738 |
| 2008/0165145 A1* | 7/2008 | Herz | G06F 3/04847 345/173 |
| 2008/0174570 A1* | 7/2008 | Jobs et al. | 345/173 |
| 2008/0229254 A1* | 9/2008 | Warner | G06F 3/04812 715/856 |
| 2008/0304890 A1* | 12/2008 | Shin et al. | 400/61 |
| 2009/0007026 A1* | 1/2009 | Scott | 715/865 |
| 2009/0021387 A1* | 1/2009 | Hosono | 340/686.1 |
| 2009/0058830 A1* | 3/2009 | Herz | G06F 3/044 345/173 |
| 2009/0128498 A1* | 5/2009 | Hollemans | G06F 3/041 345/173 |
| 2009/0172606 A1* | 7/2009 | Dunn | G06F 3/017 715/863 |
| 2009/0327964 A1* | 12/2009 | Mouilleseaux | G06F 3/0482 715/834 |
| 2010/0026723 A1* | 2/2010 | Nishihara | G06F 3/04886 345/671 |
| 2010/0090964 A1* | 4/2010 | Soo | G06F 3/0416 345/173 |
| 2010/0293499 A1* | 11/2010 | Young et al. | 715/779 |
| 2010/0328232 A1* | 12/2010 | Wood | 345/173 |
| 2011/0057886 A1* | 3/2011 | Ng | G06F 3/0482 345/173 |
| 2011/0074710 A1* | 3/2011 | Weeldreyer et al. | 345/173 |
| 2011/0083089 A1* | 4/2011 | Pahud | G06F 3/0425 715/765 |
| 2011/0141066 A1* | 6/2011 | Shimotani | G01C 21/3664 345/177 |
| 2011/0181522 A1* | 7/2011 | Rendahl | 345/173 |
| 2011/0216094 A1* | 9/2011 | Murakami | G06F 3/0485 345/660 |
| 2011/0285657 A1* | 11/2011 | Shimotani | G06F 3/0416 345/173 |
| 2012/0056850 A1* | 3/2012 | Kasahara | G06F 3/0416 345/174 |
| 2012/0068941 A1* | 3/2012 | Arrasvuori | G06F 3/04883 345/173 |
| 2012/0120002 A1* | 5/2012 | Ota | G06F 3/0488 345/173 |
| 2012/0176414 A1* | 7/2012 | Givon | 345/660 |
| 2012/0256839 A1* | 10/2012 | Suggs | 345/168 |
| 2013/0125052 A1* | 5/2013 | Baird | G06F 3/0482 715/810 |
| 2015/0052481 A1* | 2/2015 | Ronkainen | G06F 3/0416 715/815 |

FOREIGN PATENT DOCUMENTS

| | | |
|---|---|---|
| CN | 201522696 A | 7/2010 |
| CN | 101937267 A | 1/2011 |
| WO | 2005029460 A1 | 3/2005 |
| WO | WO/2011/033519 * 3/2011 | G06F 3/041 |

OTHER PUBLICATIONS

Trajectory, Vector: (1992). In C. Morris (Ed.), Academic press Dictionary of science and technology. Oxford, United Kingdom: Elsevier Science & Technology. Retrieved from http://search.credoreference.com/content/entry/apdst/trajectory/0 & /vector/0 on Dec. 1, 2015; 4 pgs.*

Vector, Vector Quantity: IEEE 100, The Authoritative Dictionary of IEEE Standards Terms, 7th edition, copyright 2000 by The Institute of Electrical and Electronics Engineers, ISBN 0-7381-2601-2; p. 1249.*

Direction. (n.d.) McGraw-Hill Dictionary of Scientific & Technical Terms, 6E. (2003); Collins Discovery Encyclopedia, 1st edition © HarperCollins Publishers 2005 Retrieved Oct. 29, 2019 from https://encyclopedia2.thefreedictionary.com/direct (Year: 2019).*

International Search Report dated Dec. 20, 2012 in PCT/US2012/59876.

Supplemental European Search Report dated Jun. 26, 2015 in Application No. 12 840 753.3.

* cited by examiner

US 10,684,768 B2

ENHANCED TARGET SELECTION FOR A TOUCH-BASED INPUT ENABLED USER INTERFACE

BACKGROUND OF THE INVENTION

Field of the Invention

The invention relates generally to a user interface and, more specifically, to enhanced target selection for a touch-based input enabled user interface.

Description of the Related Art

Touch screen displays are becoming increasingly common in consumer devices. For example, over the past decade, desktop monitors and hand-held devices have incorporated multi-touch surfaces with which users can interact to provide input information to the underlying devices. One interesting aspect of a multi-touch surface is the ability to control multiple degrees-of-freedom. For example, conventional rectangle manipulations include translation, rotation, and scaling operations performed on a multi-touch surface by dragging, rotating, or expanding/contracting, respectively, one or more contact points. Thus, a user may interact with an application via a multi-touch surface by tapping, dragging, expanding, contracting, or rotating one or more contact points on the multi-touch surface. These operations are typically more efficient to perform on a multi-touch surface than with traditional input/output devices.

Even though touch screen displays have increased in popularity, many applications include a user interface that is not optimized for receiving touch-based inputs. For example, an application may include a conventional menu bar and/or a conventional toolbar that includes small icons that are difficult for a user to accurately select. The user's ability to accurately touch a particular location compared to a conventional mouse input is decreased to the point where a user may select the wrong tool when attempted to interact with the interface using the touch screen display.

As the foregoing illustrates, what is needed in the art is a system that seamlessly adjusts the user interface to be more accessible to touch-based input.

SUMMARY OF THE INVENTION

One embodiment of the invention sets forth a computer-implemented method for displaying one or more touch-based graphical user interface elements. The method generally includes the steps of executing an application that causes a graphical user interface to be displayed on a touch screen display associated with a device, where the graphical user interface is configured to interact with one or more conventional input devices, and determining whether a user intends to provide input to the device via the touch screen display. The steps further include, if the user intends to provide input via the touch screen display, displaying the one or more touch-based graphical user interface elements on top of the graphical user interface, or, if the user intends to provide input to the device via one of the one or more conventional input devices, hiding the one or more touch-based graphical user interface elements. Each touch-based graphical user interface element corresponds to a different conventional graphical user interface element included within the graphical user interface, and each conventional graphical user interface element is configured for a different one of the one or more conventional input devices.

Another embodiment sets forth a computer-readable medium containing a program containing a program that, when executed by a processor, performs an operation for displaying one or more touch-based graphical user interface elements. Yet another embodiment sets forth a system for displaying one or more touch-based graphical user interface elements.

One advantage of the disclosed technique is that a legacy application does not need to be redesigned to enable the touch-based graphical user interface elements to be implemented for the application. A programmer could build additional functionality into the legacy application or design a separate and distinct application extension that executes in parallel with the legacy application and provides an interface for the touch-based graphical user interface. A further advantage of the disclosed technique is that the touch-based GUI elements are displayed when the user intends to use them and hidden when the user provides input in a manner that is consistent with the original design of the application's graphical user interface. The techniques set forth below efficiently let a user switch between two different types of input. For some operations, such as selecting various options or scrolling through a document, touch-based input may be more efficient, whereas other operations, such as entering text, may be more efficient using conventional input devices. The system allows both graphical user interfaces to be used substantially simultaneously with a single application.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
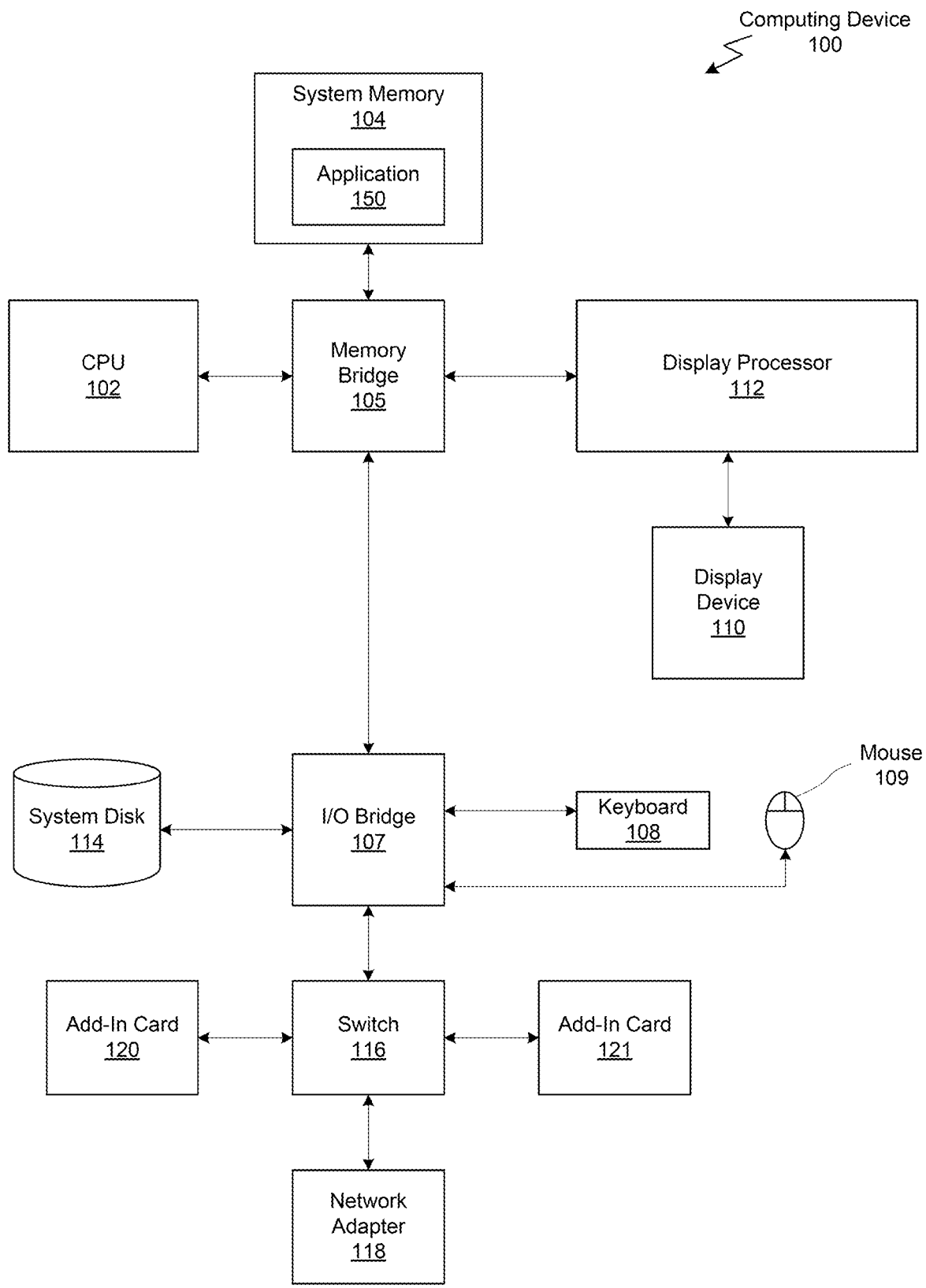
FIG. 1 is a block diagram of a system configured to implement one or more aspects of the present invention.

FIG. 1 is a block diagram of a system 100 configured to implement one or more aspects of the present invention. System 100 may be a computer workstation, personal computer, video game console, or any other device suitable for practicing one or more embodiments of the present invention.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path (e.g., a PCI Express®, Accelerated Graphics Port, or HyperTransport® link); in one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110. Display processor 112 can provide display device 110 with an analog or digital signal. Display device 110 may comprise a touch screen display device such as any conventional CRT or LED monitor with an integrated sensor that detects the presence and location of a user touching the display area of the monitor. Display device 110 may provide gesture recognition input to display processor 112 or CPU 102.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as Peripheral Component Interconnect (PCI), PCI Express (PCIe®), AGP (Accelerated Graphics Port), HyperTransport®, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, rendered images processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images. The data and/or instructions defining the desired output images can be stored in system memory 104 or a graphics memory within display processor 112. In one embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

Application 150 is stored in system memory 104. Application 150 may be any application configured to display a graphical user interface (GUI) on display device 110. For example, application 150 may be a common text editing application such as Microsoft® Word. Typically, the GUI included within application 150 is optimized for a conventional input devices such as keyboard 108 and mouse 109. For example, an icon within a toolbar of application 150 may be 5 mm by 5 mm in size when displayed on display device 110, which is not easily selectable using touch-based input. Many conventional GUI elements are not easily selected or modified based on touch-based input.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2A:
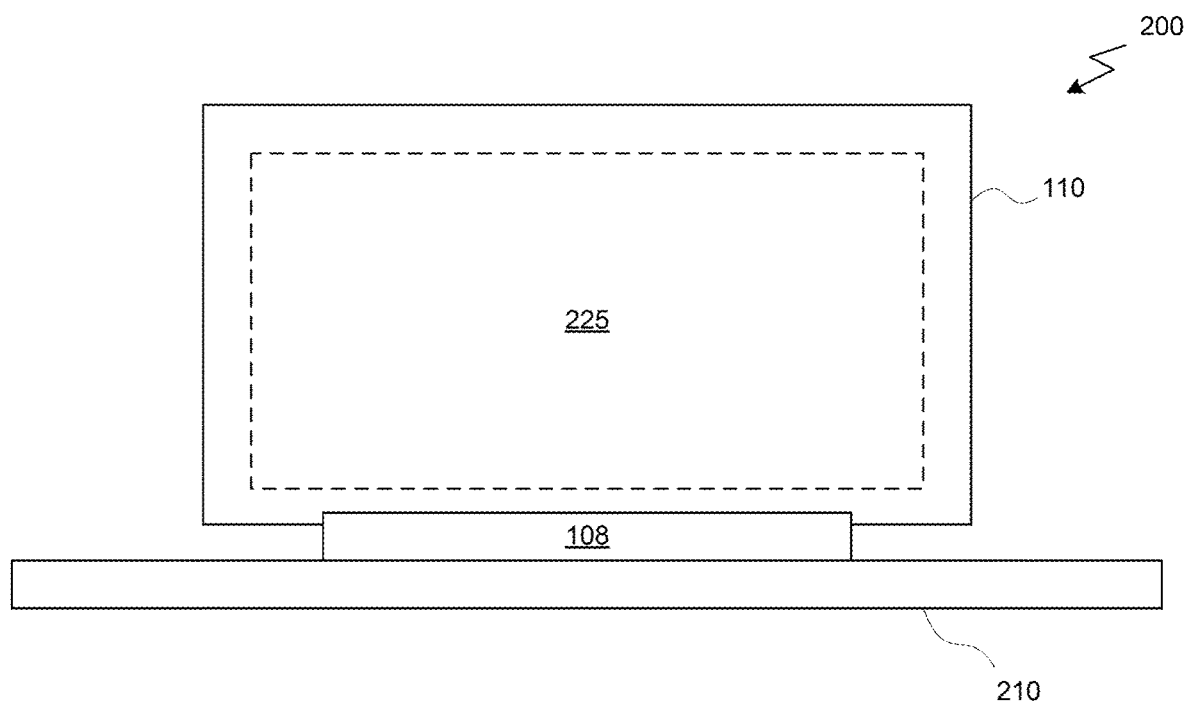
FIGS. 2A and 2B are a front-view and side-view, respectively, of a touch screen desktop environment, according to one embodiment of the present invention.
Figure 2B:
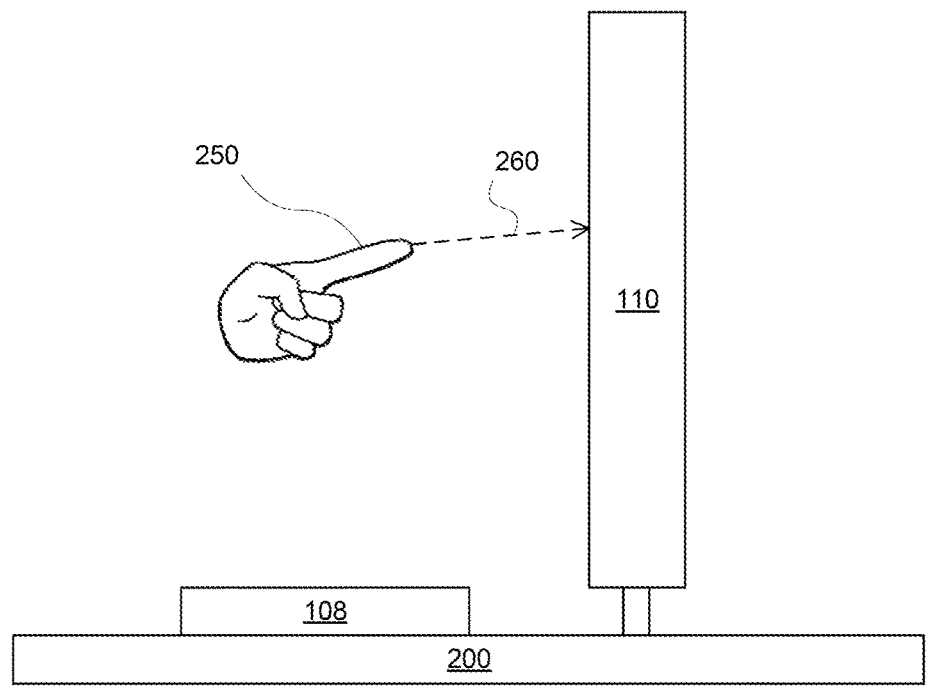

FIGS. 2A and 2B are a front-view and side-view, respectively, of a touch screen desktop environment 200, according to one embodiment of the present invention. As shown, the touch screen desktop environment 200 includes, without limitation, a display device 110 and a keyboard 108. In one embodiment, the display device 110 is positioned vertically on a desktop surface 210 facing the end-user. The keyboard 108 may be positioned on top of the desktop surface 210 between the display device 110 and the user. In other embodiments, the display device 110 may be a non-conventional display such as a projector focused on a wall that includes a proximity sensor, an iPad™ or other tablet computer, or a mobile device such as a cell phone with a touch sensitive screen.

In one embodiment, the front surface of display device 110 implements a touch sensitive area that includes multi-touch gesture recognition capabilities. An end-user may use one or more fingers to perform various gestures that initiate operations such as rotate, scale, and zoom. The display device 110 includes the capability to display graphics and video on the multi-touch surface. In addition, display device 110 may integrate a sensor 225 that enables the display device 110 to detect the presence of an object above the surface of the screen. For example, some manufacturers have produced a capacitive screen that integrates an array of optical sensors that can detect a location of a finger approximately 20 mm above the surface of the multi-touch surface. In other embodiments, display device 110 may integrate any other technically feasible technique for detecting the location of a finger in proximity to the touch-sensitive surface. For example, two or more cameras may be placed along the perimeter of display device 110 and image recognition software could be used to estimate the coordinates of an object in proximity to the multi-touch surface. In another example, a depth sensitive camera such as a CMOS sensor integrated with an infrared laser projector may be used to judge distance from the touch-sensitive surface.

As shown in FIG. 2B, when a user moves his finger 250 within range of sensor 225, the sensor 225 may detect an approximate location of the finger 250 relative to the multi-touch surface. In one embodiment, sensor 225 determines an x-coordinate, y-coordinate, and z-coordinate associated with the user's finger 250 relative to the display device 110. In addition, as sensor 225 tracks the location of the user's finger 250, a motion vector 260 may be calculated that indicates the direction of motion towards a point on the multi-touch surface. In one embodiment, sensor 225 is configured to track the position of a user's finger 250 at a slow rate such as 100 Hz (i.e., the sensor 225 calculates x, y, and z coordinates for the finger 100 times a second). CPU 102 may be configured to generate a motion vector 260 based on the last two sampled coordinates of sensor 225. In alternative embodiments, the motion vector 260 may be generated based on more than two samples of sensor 225. For example, CPU 102 may generate motion vector 260 based on three or more samples of sensor 225, selecting the motion vector 260 that produces the minimum mean square error for the sampled position coordinates. Motion vector 260 may be scaled such that motion vector 260 intersects with a plane associated with the surface of display device 110. It will be appreciated that sensor 225 may be configured to track any object that is proximate to the surface of the display device 110. For example, instead of a finger, a user may use a stylus to provide touch based input.

In one embodiment, display device 110 is enabled to detect multi-touch input. For example, the user may touch two or more points on the surface of display device 110 to provide multi-touch input. Various multi-touch gestures are well known in the art. In such embodiments, sensor 225 may be configured to track multiple objects, such as multiple fingers. The motion vector 260 may be determined based on the object closest to the display device 110. In alternative embodiments, motion vector 260 may be based on some combination of two or more motion vectors calculated for multiple objects. For example, the motion vector 260 could be calculated based on an average of two or more motion vectors.

Figure 3:
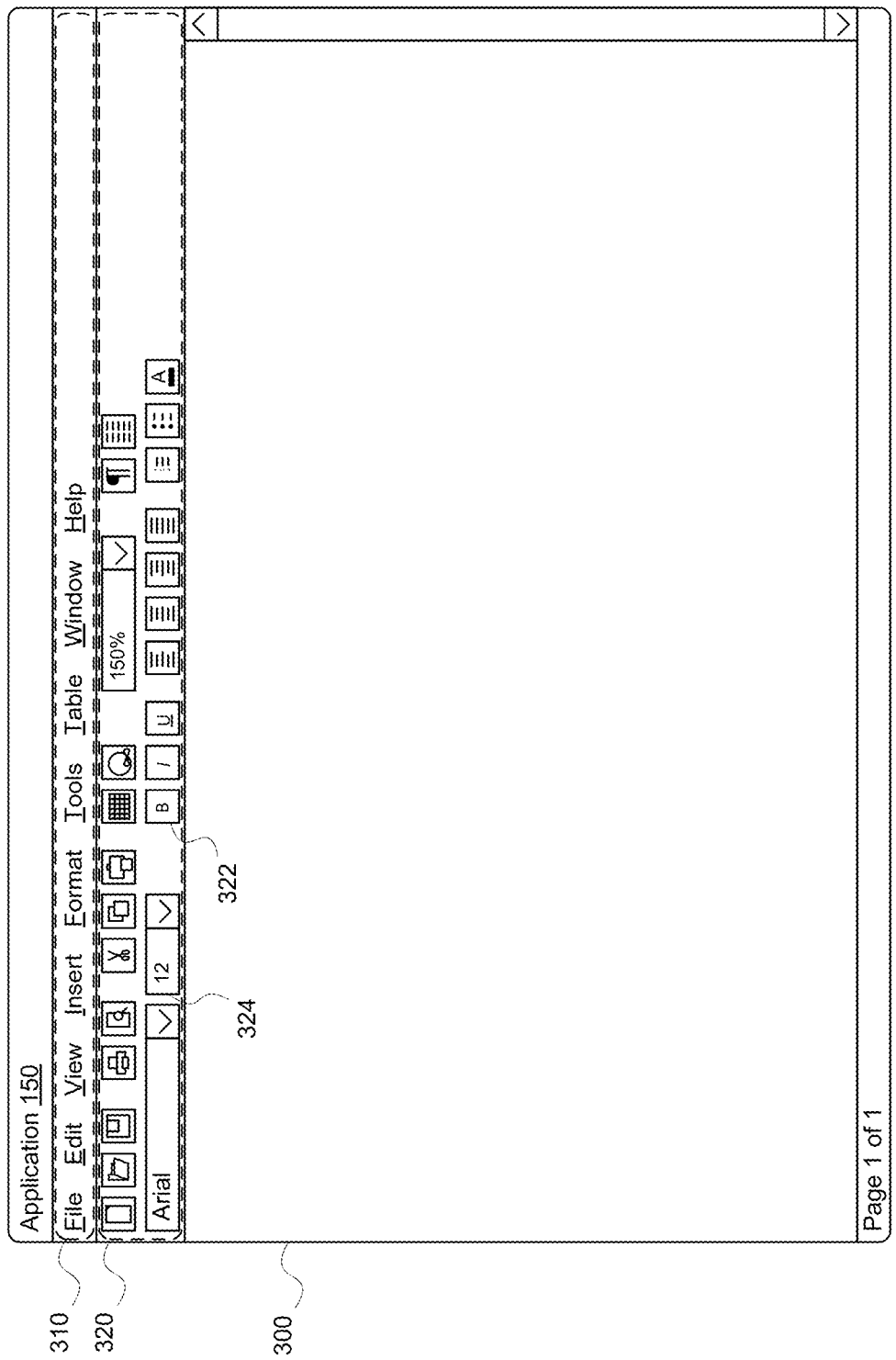
FIG. 3 illustrates a graphical user interface generated by an application and displayed on a display device, according to one embodiment of the present invention.

FIG. 3 illustrates a graphical user interface 300 generated by an application 150 and displayed on a display device 110, according to one embodiment of the present invention. As shown, application 150 is a text editing application that implements GUI 300 and includes a menu bar 310 and a toolbar 320. In alternative embodiments, application 150 may be some other type of application such as a computer-aided design (CAD) application, a spreadsheet application, or an email application.

Menu bar 310 includes such menu items as a File menu, an Edit menu, and a Help menu. When a user selects one of the menu items either using a mouse 109 or a hotkey combination with keyboard 108, a drop down menu may appear that provides additional GUI elements associated with various functions of application 150. For example, when a user selects the File menu, a drop down list may appear that includes GUI elements such as Open, Save, and Save As that, when selected by a user, are configured to cause dialog boxes to be displayed for performing various file system operations. Toolbar 320 includes a plurality of GUI elements as well. As shown in FIG. 3, toolbar 320 includes one or more toolbar icons 322 as well as one or more combo-boxes 324 (i.e., a combination of a single line text box and a drop-down list box). Such toolbar icons 322 may include a save icon, a print icon, and various style icons related to a text font such as a bold icon, an italics icon, and an underline icon. The combo-boxes 324 may include GUI elements for selecting a particular font or font size. It will be appreciated that other types of GUI elements may be included in menu bar 310 or toolbar 320. Furthermore, the particular design of GUI 300 shown in FIG. 3 is provided to illustrate various techniques of the present invention and should not be construed to limit the invention to this particular GUI. The scope of this disclosure contemplates other GUI designs as well as other types of GUI elements known in the art. For example, other types of GUI elements include radio buttons and drop-down lists.

As shown in FIG. 3, the GUI 300 is designed for receiving input from conventional input devices such as keyboard 108 and mouse 109. GUI elements may be designed for ease of use with touch-based input such as by designing toolbar icons 322 with a minimum size that corresponds to an accuracy provided by touch-based sensing technology. For example, by studying the characteristics of a user base and comparing the characteristics to the sensitivity of a capacitive touch screen sensor, a GUI designer may determine that a user can select a point on the screen to an accuracy of 10 mm. Therefore, any GUI element that is designed for touch-based input should be designed with an accuracy expectation of 10 mm. Such GUI elements may be too large to effectively provide a user with all of the commonly used functions on one screen. Ideally, application 150 could be configured to display GUI elements optimized for touch-based input when the user provides touch-based input and, conversely, to display the conventional GUI elements when the user provides conventional input using a keyboard and mouse. Two such techniques for displaying touch-based GUI elements to a user are discussed below.

TouchCuts

Figure 4:
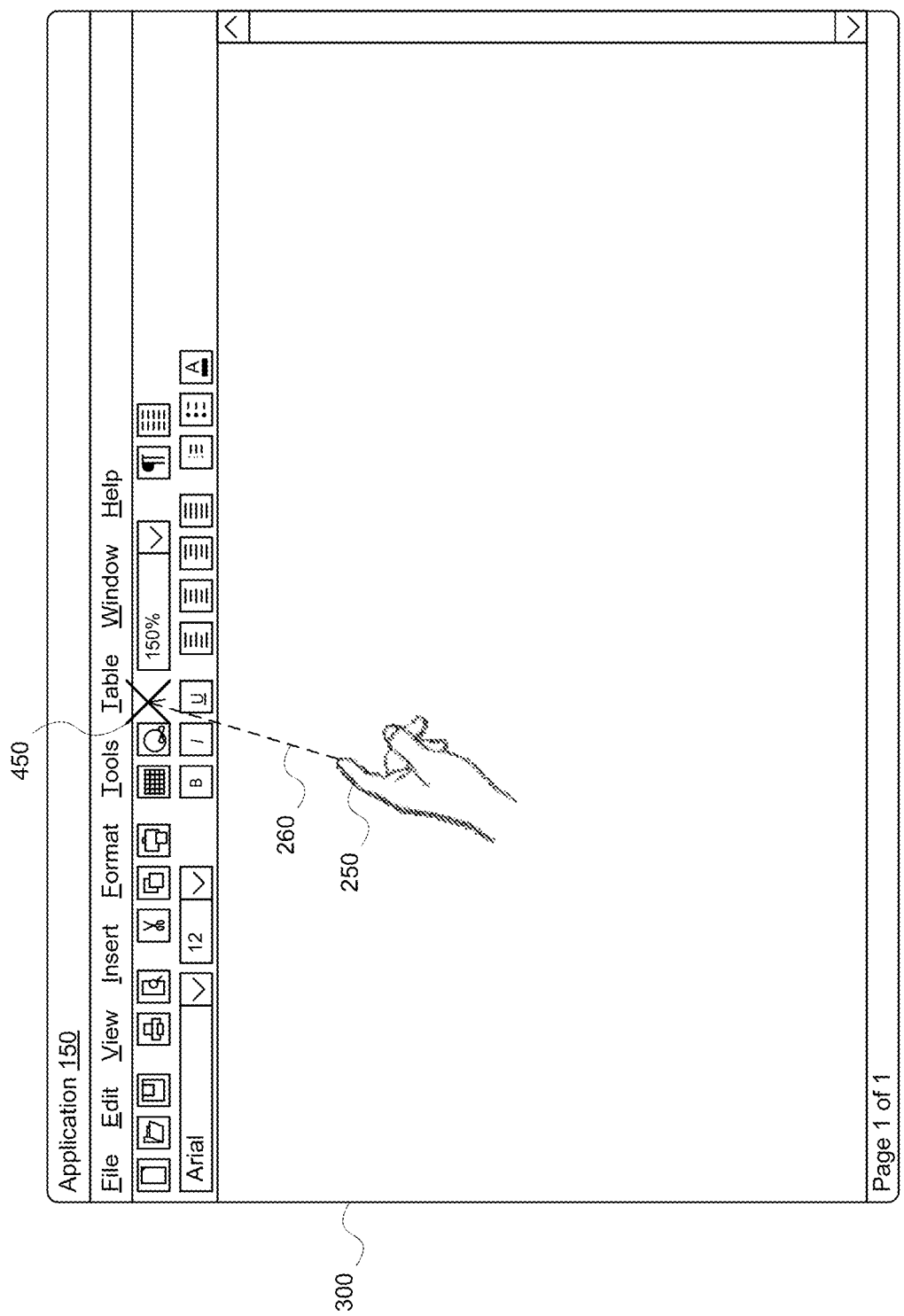
FIG. 4 illustrates how application detects a finger proximate to the display device, according to one embodiment of the present invention.

FIG. 4 illustrates how application 150 detects a finger 250 proximate to the display device 110, according to one embodiment of the present invention. A user may launch application 150 on computer system 100. Application 150 causes GUI 300 to be displayed on display device 110. Although application 150 is configured to receive input via keyboard 108 and mouse 109, application 150 may also be configured to receive touch-based input from display device 110.

As shown in FIG. 4, a user may provide touch-based input by touching the touch-sensitive area of display device 110 with the user's finger 250. In one embodiment, display device 110 includes a sensor 225 that may sense when the user's finger 250 is proximate to the touch-sensitive area of display device 110. For example, in one embodiment, display device 110 may include the capability to detect a finger 250 when the finger is within 20 mm of the surface of display device 110. When sensor 225 detects the presence of a finger 250, sensor 225 transmits a position of the finger 250 to application 150. Sensor 225 may be configured to transmit a new position to application 150 at regular intervals until sensor 225 can no longer detect finger 250, indicating that the finger 250 is no longer approaching the touch-sensitive area of display device 110.

Application 150 may be configured to generate motion vector 260 based on the coordinates received from sensor 225. For example, motion vector 260 may be the vector directed from a first set of coordinates received from sensor 225 to a second set of coordinates received from sensor 225. Consequently, motion vector 260 represents the direction of finger 250 as a user moves to touch display device 110. Based on the motion vector 260, application 150 may calculate a target location 450 associated with GUI 300 that represents a predicted point on display device 110 that the user is attempting to touch. For example, application 150 may be configured to determine the intersection of motion vector 260 with the surface of display device 110 (i.e., the plane formed by all points with a z-coordinate of 0). Target location 450, therefore, represents an estimation of which element of GUI 300 the user is targeting.

It will be appreciated that the target location 450 may be more accurate the closer the user's finger 250 gets to the surface of display device 110. In addition, the accuracy of the estimation algorithm is affected by the sampling frequency of the position information, the number of samples that effect the calculation, and the relative distance of the finger from the surface of the display device 110.

Figure 5:
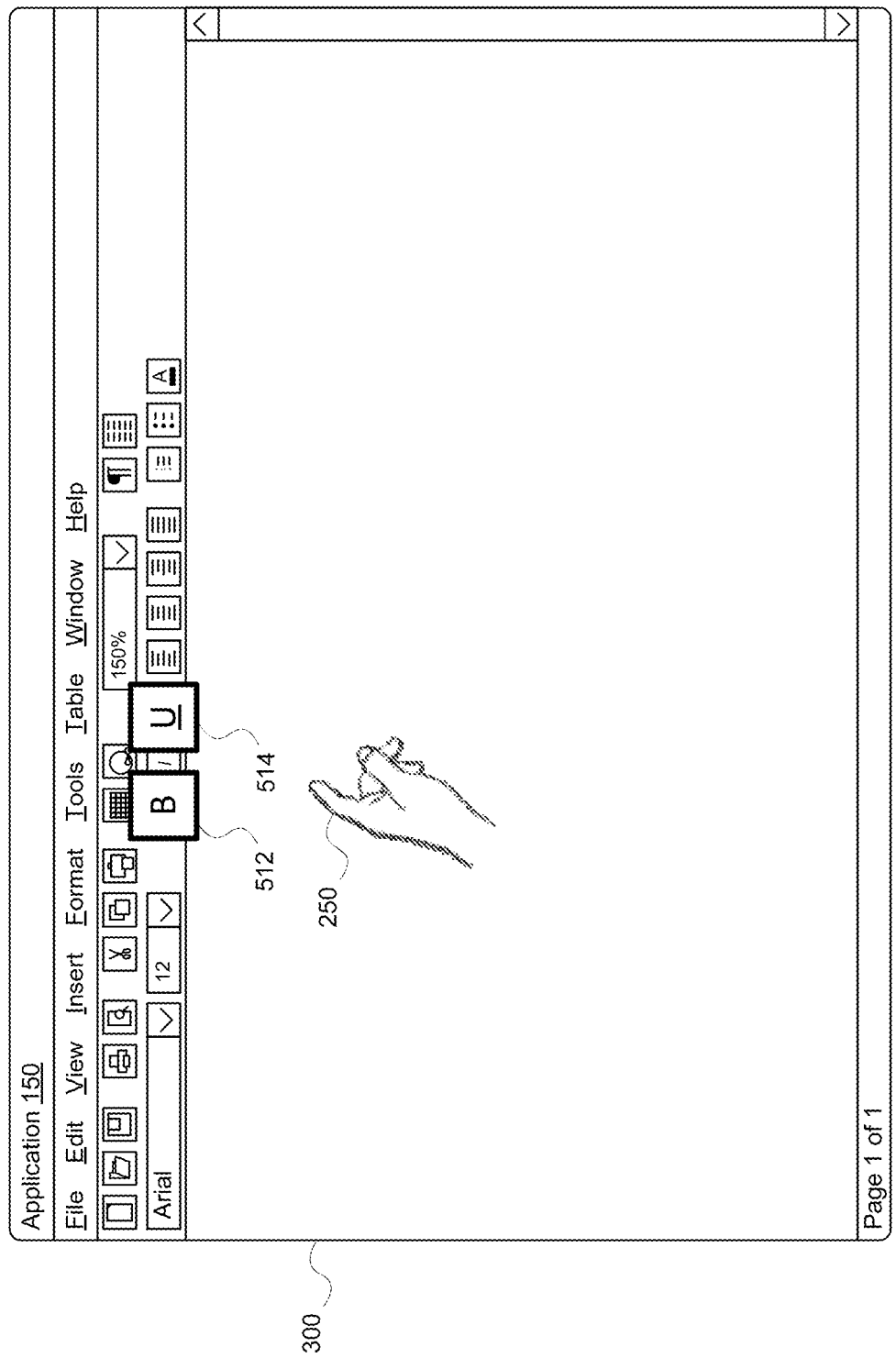
FIG. 5 illustrates a technique for displaying graphical user interface elements optimized for touch-based input, according to one embodiment of the present invention.

FIG. 5 illustrates a technique for displaying GUI elements optimized for touch-based input, according to one embodiment of the present invention. In one embodiment, when application 150 detects finger 250 proximate to display device 110, application 150 causes one or more touch-based GUI elements to be displayed over GUI 300. For example, application 150 causes touch-based icons 512 and 514 to be overlaid on top of GUI 300. Touch-based icon 512 corresponds to a bold icon in GUI 300 and touch-based icon 514 corresponds to an underline icon in GUI 300.

In another embodiment, a triggering event causes application 150 to display the touch-based GUI elements. In one embodiment, where depth sensing is not required, the triggering event may be detected whenever a user first touches the surface of display device 110. The touch-based GUI elements could be displayed if the coordinate of the target location 450 is proximate to an element of GUI 300 associated with one of the touch-based GUI elements. In another embodiment, the triggering event could be detected whenever sensor 225 detects a finger 250 proximate to the display device 110. In yet another embodiment, the triggering event may compare the z-coordinate of the position of the finger 250 to a threshold value. For example, the triggering event may occur whenever the finger 250 comes within 10 mm of the display device 110. Even though sensor 225 may be capable of detecting the finger 250 much further away than the threshold value, basing the triggering event on a threshold value reflects a higher probability that the user is intending to touch the display device 110. In another embodiment, the triggering event may occur only when the finger 250 is positioned with a threshold value from the display device 110 within a particular region of the screen. For example, the triggering event occurs when the finger 250 is within 10 mm of the display device 110 and the y-coordinate of the position is also above a second threshold (e.g., the finger is approaching the top half of the screen).

In yet another embodiment, multiple triggering events may be defined based on two or more threshold values. Each triggering event may cause the touch-based GUI elements to be displayed at a different scale factor. For example, when the finger 250 is less than a first threshold distance from the surface of the display device 110 a first triggering event causes touch-based GUI elements to be displayed at a 50% scale, which may still be larger than the conventional GUI elements of GUI 300. When the finger 250 is then less than a second threshold distance, smaller than the first threshold distance, from the surface of the display device 110 a second triggering event causes touch-based GUI elements to be displayed at 100% scale.

It will be appreciated that the triggering event does not require target prediction (i.e., determining an estimated intersection between the motion vector 260 of the finger 250 and the display device 110). The set of touch-based GUI elements is displayed at a position overlaid on GUI 300 that is independent of any type of target location 450.

In one embodiment, the touch-based icons (e.g., 512, and 514) are displayed on top of associated GUI elements in GUI 300. The touch-based icons may be opaque or partially transparent. In alternative embodiments, the touch-based GUI elements may be displayed in different positions on the display device 110. For example, all touch based icons could be aligned to the upper-left of the GUI 300. Alternatively, a user could determine where the touch-based GUI elements are positioned on the display device 110 using input from mouse 109 or touch-based input. In yet other embodiments, a tooltip associated with the touch-based GUI elements may be displayed if the user hovers his finger 250 above the surface of the display device after the triggering event. For example, a tooltip that includes the text "Bold" may appear next to touch-based icon 512.

Touch-based icons 512 and 514 are included in the set of touch-based GUI elements displayed by application 150 when a triggering event is detected. The set of touch-based GUI elements may be configured automatically by application 150 or may be manually configured by a user of application 150. For example, the set of touch-based GUI elements may correspond to the most frequently used GUI elements of GUI 300. Alternatively, the set of touch-based GUI elements may be empty when application 150 is first launched and a user manually selects which touch-based GUI elements to add to the set, each touch-based GUI element corresponding to one of the GUI elements in GUI 300.

Figure 6:
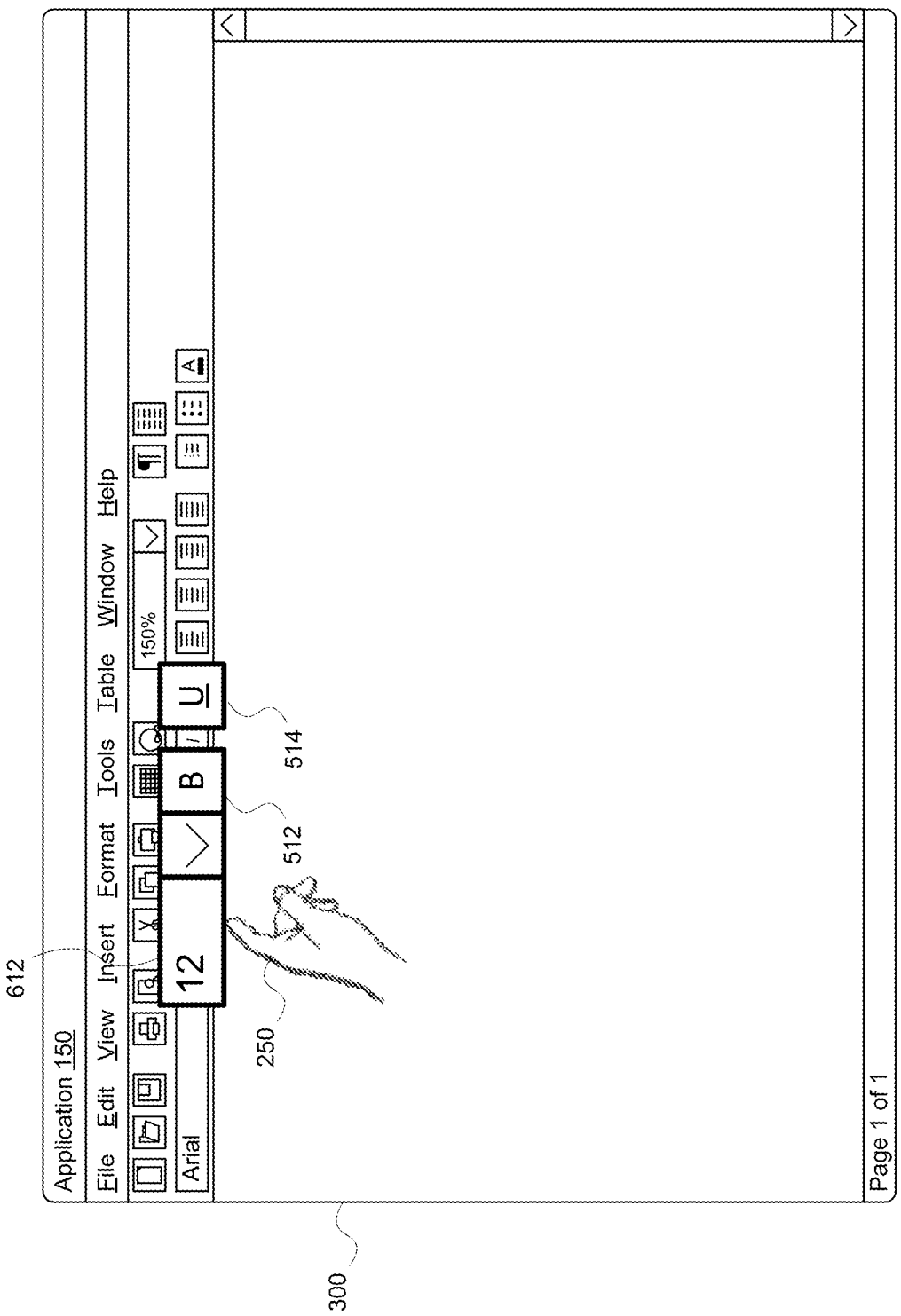
FIG. 6 illustrates a procedure for associating conventional graphical user interface elements with a set of touch-based graphical user interface elements displayed by the application, according to one embodiment of the present invention.

FIG. 6 illustrates a procedure for associating conventional GUI elements with a set of touch-based GUI elements displayed by the application 150, according to one embodiment of the present invention. Touch-based combo-box 612 is now included in the set of touch-based GUI elements displayed by the application 150. In one embodiment, a user touches display device 110 at a location proximate to combo-box 324 of GUI 300 (i.e., the font size combo-box). The user indicates that a touch-based GUI element corresponding to combo-box 324 should be added to the set of touch-based GUI elements through some combination of keystrokes via keyboard 108 or mouse input via mouse 109. For example, the user could hit a hotkey such as "F8" to indicate that a touch-based GUI element should be added to the set of touch-based GUI elements. Once the user has added touch-based GUI element 612 to the set of touch-based GUI elements, whenever application 150 detects a triggering event, each of the touch-based GUI elements in the set of touch-based GUI elements is displayed over GUI 300.

A user may specify which conventional GUI elements of GUI 300 to include in the set of touch-based GUI elements displayed by application 150. In one embodiment, to associate a GUI element in GUI 300 with a touch-based GUI element displayed by application 150, a user may tap display device 110 close to a desired GUI element that the user wishes to include in the set of touch-based GUI elements. Then, the user may click and drag the cursor via the mouse 109 to define the desired size of the touch-based GUI element. Similarly, to remove a touch-based GUI element from the set of touch-based GUI elements displayed by application 150, a user may tap the touch-based GUI element followed by selecting the touch-based GUI element with mouse 109.

As described above, the technique for displaying touch-based GUI elements in response to detecting a triggering event enables efficient use of touch-based input with legacy applications. Importantly, the touch-based GUI elements only need to be displayed when the system detects that the user is intending to use touch-based input. However, the increased size of the touch-based GUI elements may make optimizing all available GUI elements impractical because the available screen space is limited. Another technique for displaying a touch-based GUI is described below.

TouchZoom

Figure 7A:
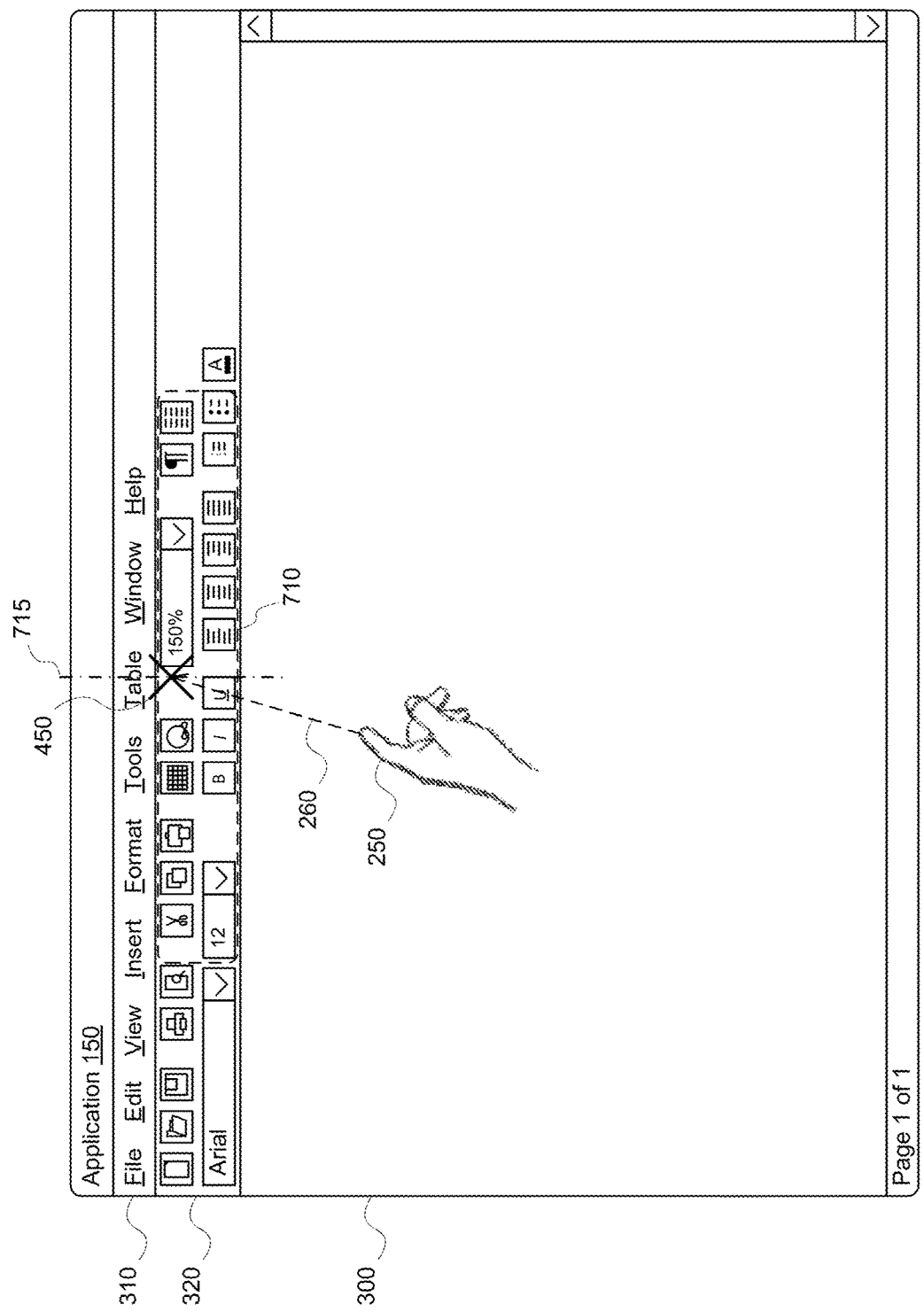
FIG. 7A illustrates how application determines a target location based on the motion vector associated with a finger proximate to display device, according to one embodiment of the present invention.

FIG. 7A illustrates how application 150 determines a target location 450 based on the motion vector 260 associated with a finger 250 proximate to display device 110, according to one embodiment of the present invention. As shown in FIG. 7A, application 150 determines a target location 450 based on the intersection of motion vector 260 with the touch-sensitive surface of display device 110. For example, application 150 determines two consecutive positions of finger 250 (i.e., each position includes an x-coordinate, y-coordinate, and z-coordinate for finger 250) and calculates a motion vector 260 based on the difference between the two positions. The motion vector 260 is then scaled such that the motion vector intersects with the touch-sensitive surface of display device 110 (i.e., corresponding to the plane where the z-coordinates equal 0). The point of intersection between motion vector 260 and the multi-touch surface of display device 110 is determined to be the target location 450.

In one embodiment, application 150 determines a portion of a toolbar to expand into a touch-based toolbar. For example, as shown in FIG. 7A, application 150 selects a portion 710 of toolbar 320 that corresponds to a center of expansion 715 based on target location 450. The center of expansion is the top of toolbar 320 at the x-coordinate corresponding to target location 450. Therefore, when the touch-based toolbar is displayed, the touch-based toolbar appears to expand down from the top of toolbar 320.

Figure 7B:
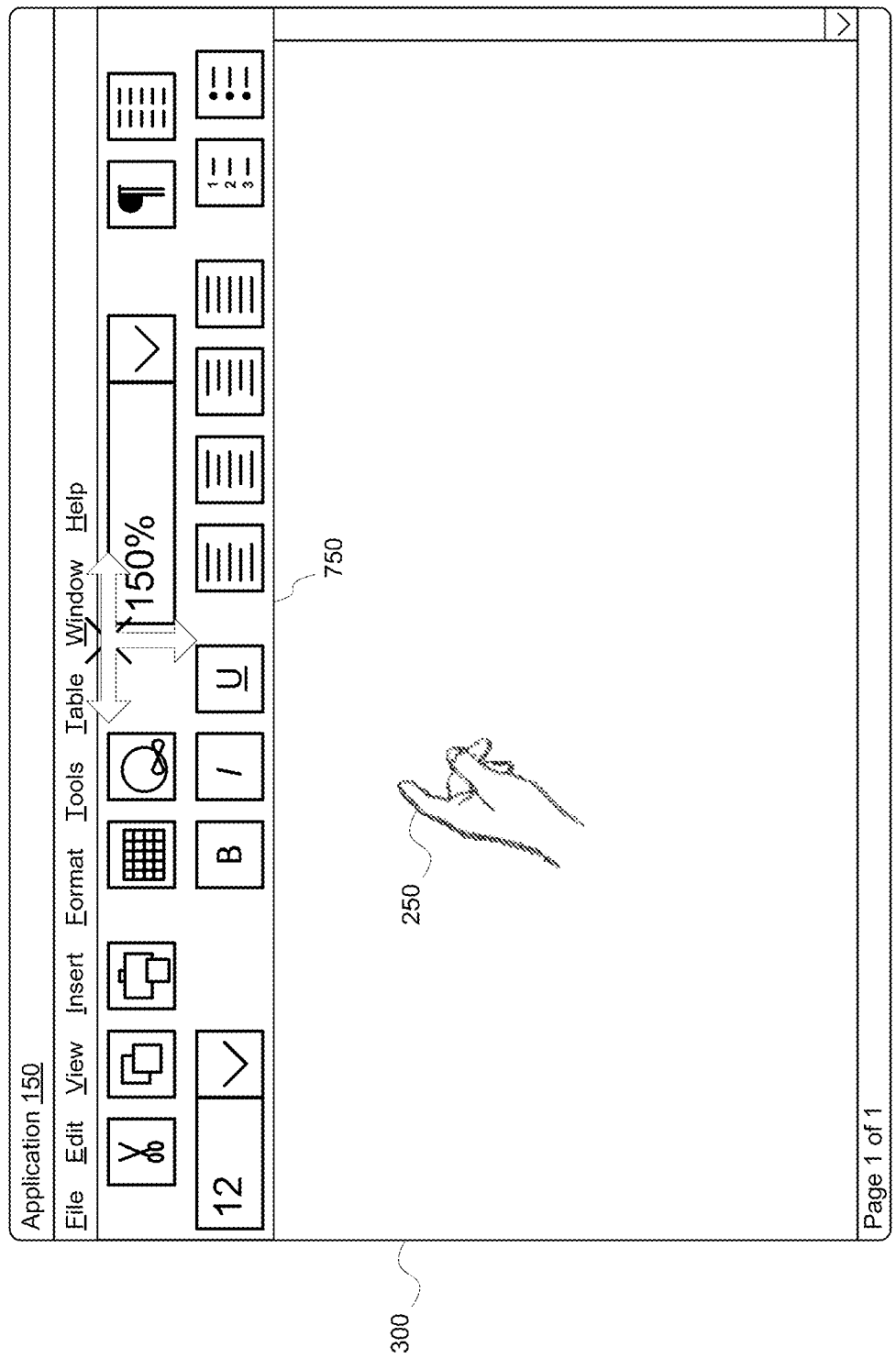
FIG. 7B illustrates a touch-based toolbar overlaid on top of toolbar in graphical user interface, according to one embodiment of the present invention.

FIG. 7B illustrates a touch-based toolbar 750 overlaid on top of toolbar 320 in GUI 300, according to one embodiment of the present invention. As shown in FIG. 7B, toolbar 750 is twice as large as toolbar 320. Toolbar 750 is sized to accommodate touch-based input. It will be appreciated that toolbar 750 only includes touch-based GUI elements corresponding to the GUI elements within the portion 710 of toolbar 320 that corresponds to the center of expansion 715 in FIG. 7A. Unlike TouchCuts, described above, TouchZoom enables access to each GUI element in GUI 300 proximate to an estimated target location 450. This operation ensures expansion of the desired touch-based GUI element, even with a slight error in the estimation of the target location 450.

Figure 8A:
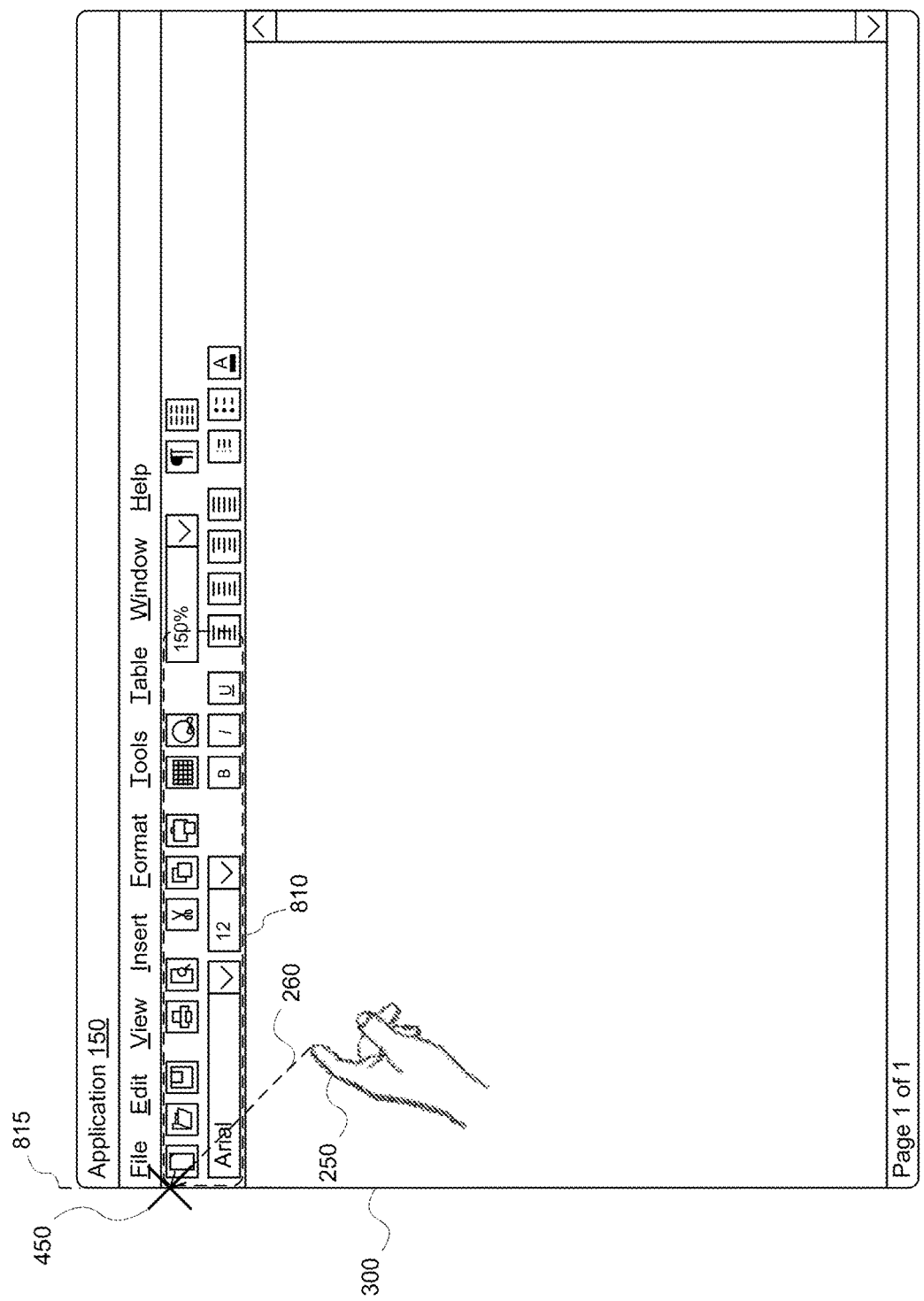
FIGS. 8A and 8B illustrate an approach to expanding toolbar, according to one embodiment of the present invention.
Figure 8B:
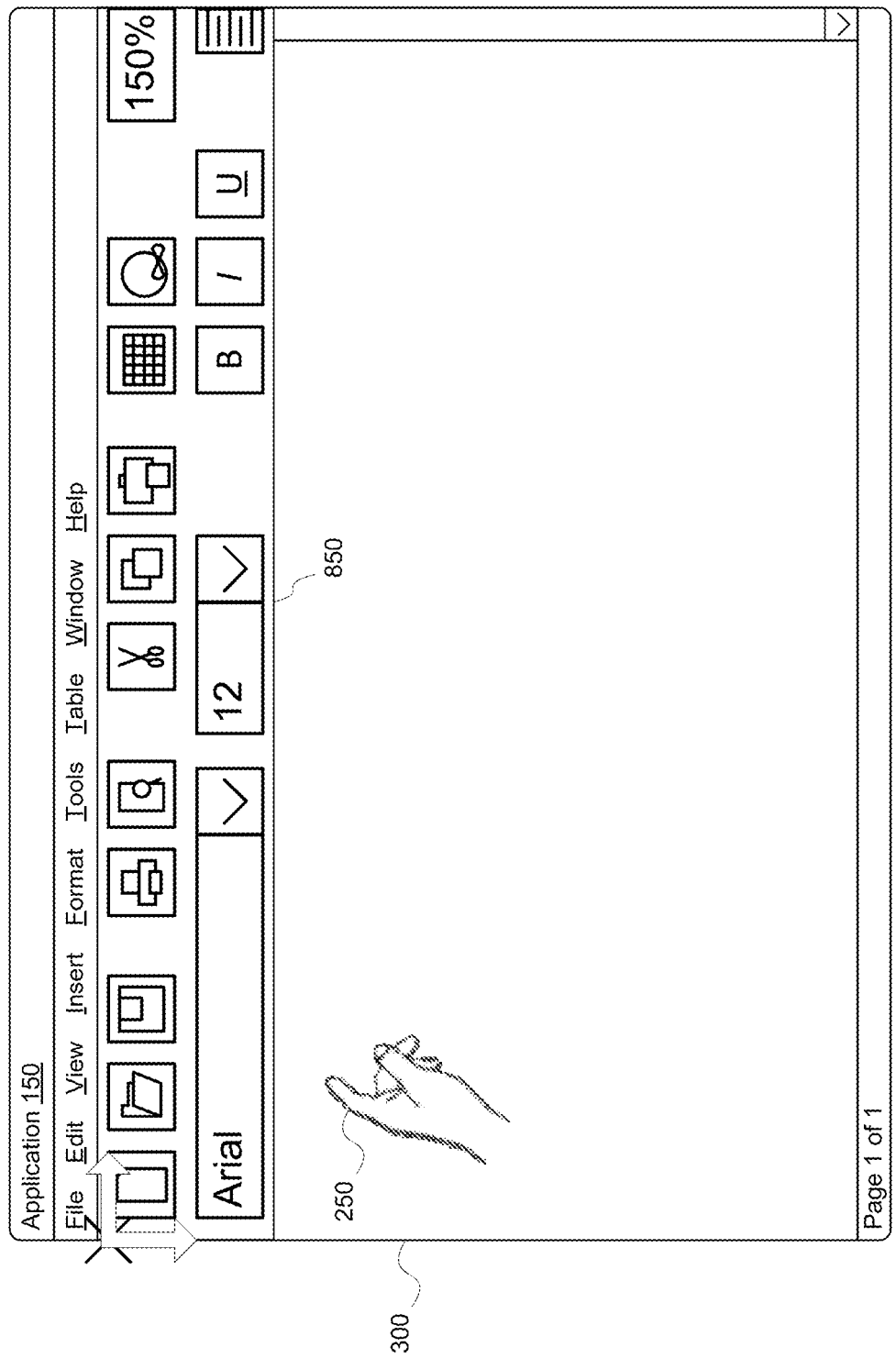

In one embodiment, the toolbar 320 may be expanded relative to the position of target location 450 on display device 110. FIGS. 8A and 8B illustrate an approach to expanding toolbar 320, according to one embodiment of the present invention. As shown in FIG. 8A, target location 450 is positioned at the extreme left edge of display device 110. In this scenario, the portion 810 of toolbar 320 is located entirely to the right of center of expansion 815. As shown in FIG. 8B, the left edge of toolbar 850 corresponds to the left edge of the portion 810 of toolbar 320. In other words, toolbar 320 is expanded down and to the right to display touch-based GUI elements corresponding to the various GUI elements in toolbar 320.

In another embodiment, toolbar 320 is expanded using different techniques based on the position of target location 450 relative to different zones of display device 110. If target position 450 is located within an edge zone defined as an area close to the left edge of display device 110, then the center of expansion 815 of toolbar 320 is located on the left edge of display device 110 and toolbar 850 expands both down and to the right. Similarly, if target position 450 is located within another edge zone defined as an area close to the right edge of display device 110, then the center of expansion 815 of toolbar 320 is located on the right edge of display device 110 and toolbar 850 expands both down and to the left. For example, the edge zone may be defined to be anywhere within 50 mm of the edge of the display device 110. If target location 450 is located within 50 mm of an edge of display device 110, then the center of expansion 815 of toolbar 320 is located at the edge of display device 110 regardless of where within the edge zone the target location 450 is actually located.

In addition, if target position 450 is located within a center zone of display device 110, then the center of expansion corresponds to the target position 450 and toolbar 320 expands uniformly in both directions from the center of expansion 815. A buffer zone may be defined between the edge zone and the center zone, where, similar to the center zone, the center of expansion 815 corresponds to the target location 450 but, unlike in the center zone, toolbar 320 is expanded non-uniformly around the center of expansion 815. For example, if the edge zone is defined as from 0 mm to 30 mm from the left edge of display device 110, the buffer zone is defined as from 30 mm to 50 mm from the left edge of display device 110, and application 150 estimates target location 450 to be 40 mm from the left edge of display device 110, then portion 810 would be selected such that 25% of portion 810 is located to the left of the center of expansion 815 and 75% of portion 810 is located to the right of the center of expansion 815. The percentage of portion 810 on one side of the center of expansion 815 compared to the other side of the center of expansion ranges linearly over the buffer zone from 0% if the target location 450 is within the edge zone to 50% if the target location 450 is within the center zone.

Figure 9:
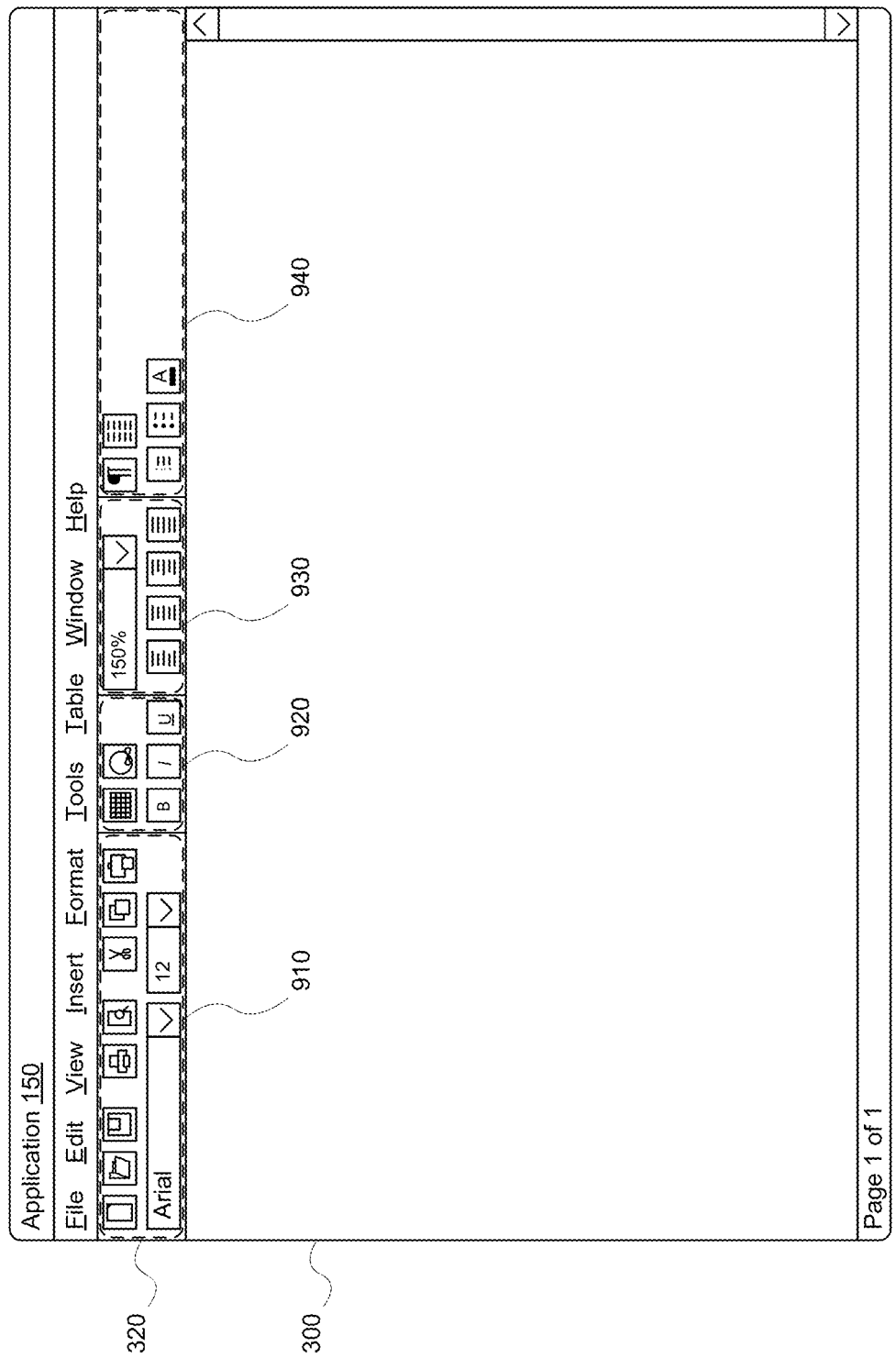
FIG. 9 illustrates a different algorithm for estimating a center of expansion for toolbar, according to yet another embodiment of the present invention.

FIG. 9 illustrates a different algorithm for estimating a center of expansion for toolbar 320, according to yet another embodiment of the present invention. Toolbar 320 is divided into a plurality of groups of GUI elements. As shown in FIG. 9, toolbar 320 includes four distinct groups of GUI elements, group 910, group 920, group 930, and group 940. In this approach, application 150 may determine a center of expansion 815 based on which group target location 450 is closest to. In one embodiment, application 150 determines whether target location 450 intersects with one of groups of GUI elements (910, 920, etc.). Target location 450 intersects with one of the groups of GUI elements if target location 450 is located at a pixel position in display device 110 within a group of GUI elements of toolbar 320. In another embodiment, application 150 determines the closest distance between target location 450 and each of the groups of GUI elements (i.e., any pixel within the group of GUI elements of toolbar 320). The set of pixels within the group of GUI elements includes pixels that are included in the GUI elements within the group as well as pixels that are included in the background of toolbar 320 between the GUI elements within the group.

Once application 150 determines which group of GUI elements (910, 920, etc.) in toolbar 320 is closest to the target location 450, then toolbar 320 is expanded based on a center of expansion associated with that group of GUI elements. For example, a center of expansion for group 910 may be located at the top, left edge of group 910. A center of expansion for groups 920 and 930 may be located at the top, center of the groups of GUI elements. A center of expansion for group 940 may be located at the top, right edge of group 940. In one embodiment, the entirety of toolbar 320 is expanded similar to toolbar 750 or toolbar 850.

Figure 10:
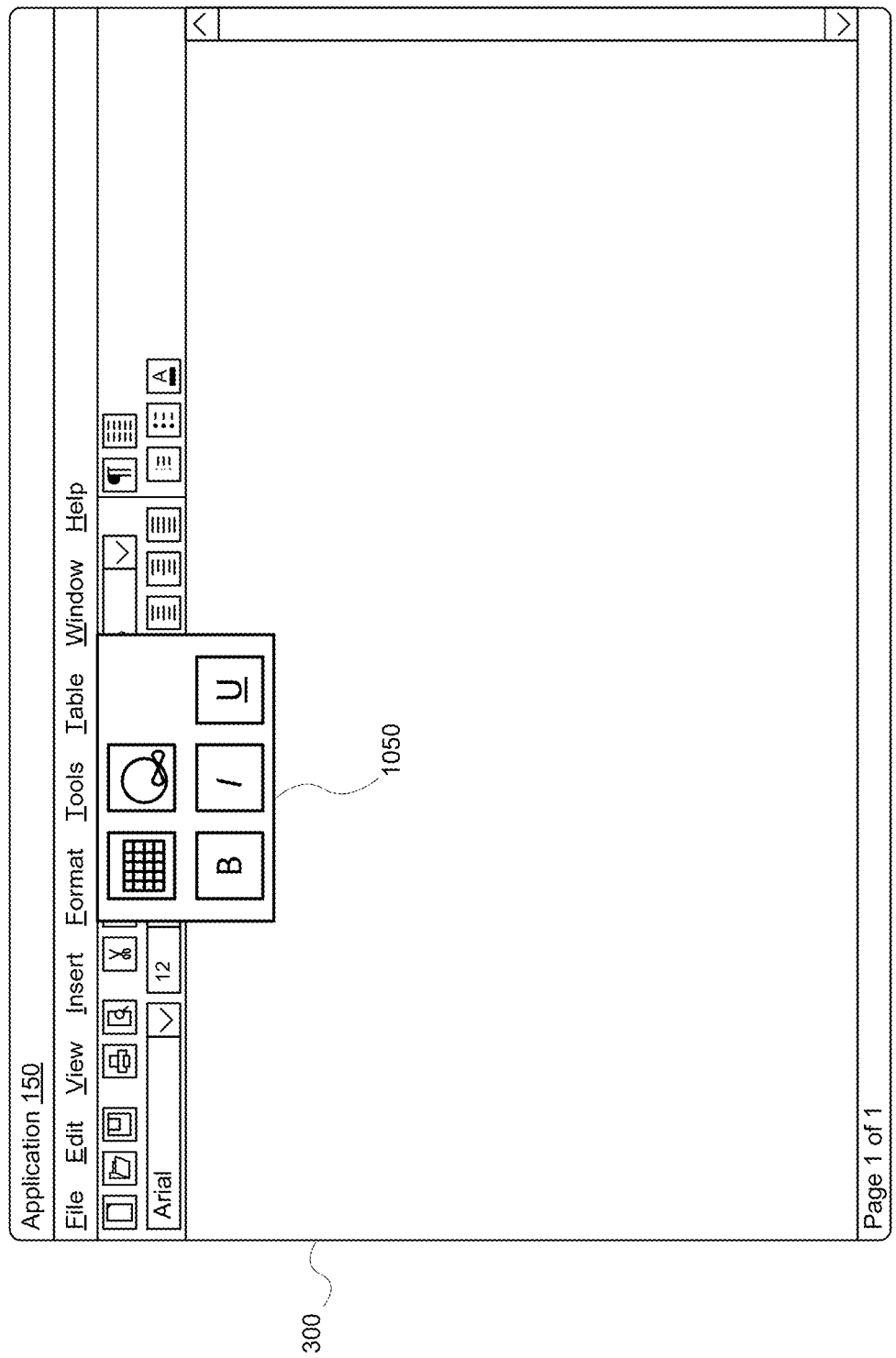
FIG. 10 illustrates an approach for expanding only a portion of toolbar, according to another example embodiment of the present invention.

In an alternative embodiment, only a portion of toolbar 320 is expanded. FIG. 10 illustrates an approach for expanding only a portion of toolbar 320, according to another example embodiment of the present invention. As shown in FIG. 10, only a portion of toolbar 320 is expanded into touch-based toolbar 1050. Although not shown explicitly, touch-based toolbar 1050 corresponds to a target location 450 that intersects with or is closest to group of GUI elements 920 in toolbar 320 (as shown in FIG. 9). The center of expansion of the group of GUI elements 920 is the top, centered pixel of the group of GUI elements 920. Thus, touch-based toolbar 1050 is located at a position that is approximately centered on the center of expansion of group 920.

In one embodiment, toolbar 320 may include GUI elements that are configured as functionality reduction controls. A functionality reduction control may be configured to have certain functions when the user provides input using conventional input devices. However, if toolbar 320 is expanded based on the detection of an object proximate to the display device 110, then the GUI element may transition into a touch-based GUI element with the same footprint as the original GUI element of toolbar 320 but with reduced functionality. For example, if a toolbar includes a color palette that is configured as a functionality reduction control, then the color palette may be replaced by a plurality of color selection icons that allow the user to pick only a subset of preconfigured colors from the color palette. The user can quickly choose one of the preconfigured colors using touch-based input (such as 8 primary colors) or choose one of the available colors from the color palette using convention mouse input (such as 256 available colors).

It will be appreciated that the techniques described above in connection with TouchCuts and TouchZoom may be implemented by modifying a legacy application program designed for purely conventional GUI elements. Alternatively, an application extension may be designed that interfaces with application 150, in effect displaying a separate GUI on top of the GUI displayed by application 150. The separate GUI captures touch-based input received from display device 110, processes the touch-based input to determine a particular GUI element in application 150 associated with the touch-based input, and transmit corresponding conventional input associated with the particular GUI element to application 150. In effect, the application extension intercepts touch-based commands and converts the touch-based commands into conventional commands suitable for application 150.

Figure 11:
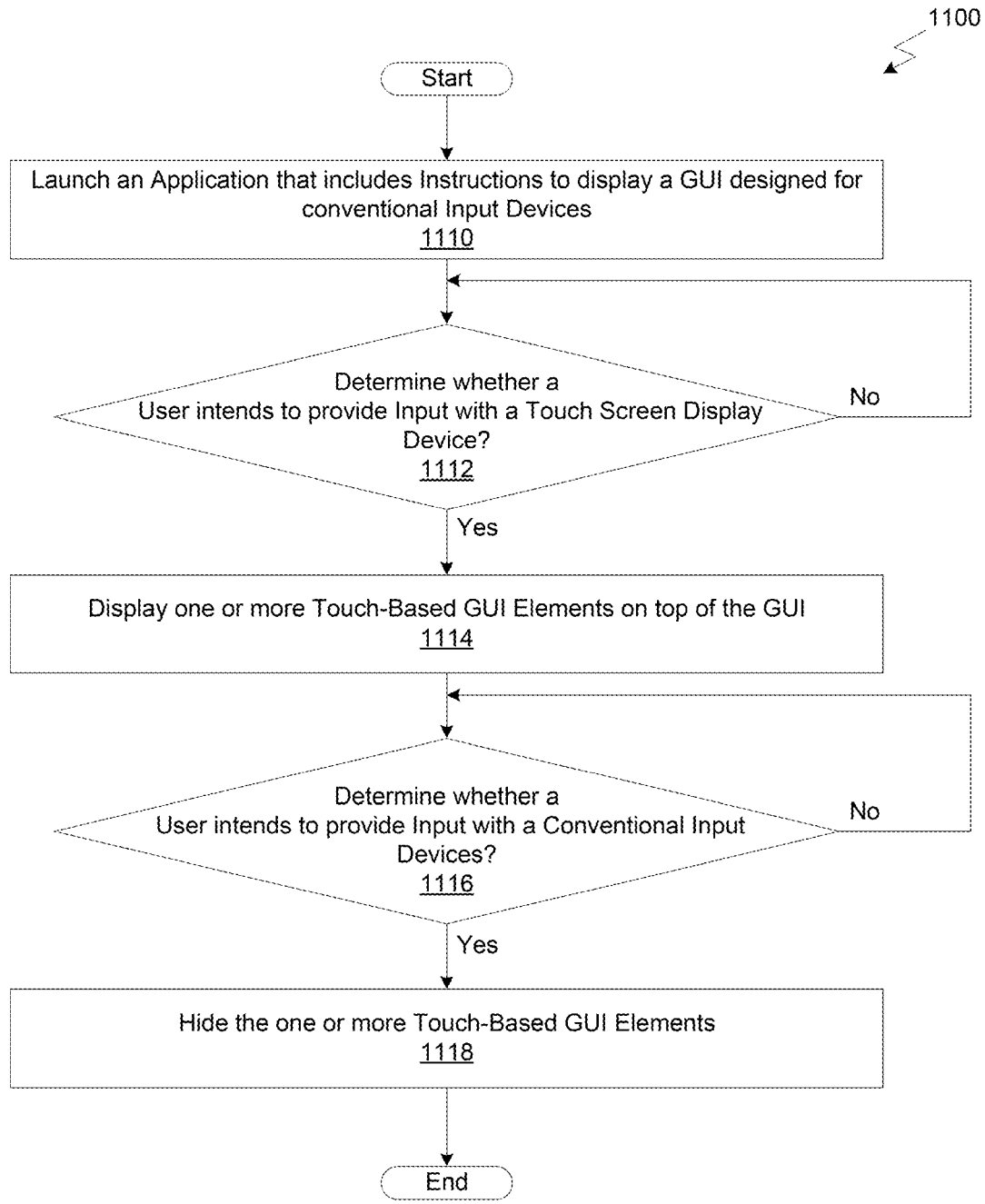
FIG. 11 is a flowchart of method steps for displaying touch-based graphical user interface elements in an application, according to one example embodiment of the present invention.

FIG. 11 is a flowchart of method steps 1100 for displaying touch-based graphical user interface elements in an application 150, according to one example embodiment of the present invention. Although the method steps are described in conjunction with the systems of FIGS. 1-10, persons skilled in the art will understand that any system configured to perform the method steps, in any order, is within the scope of the inventions.

The method 1100 begins at step 1110, where a user launches an application 150 that includes instructions to display a GUI 300 that is designed for conventional input devices such as keyboard 108 or mouse 109. The application 150 is executed by CPU 102, which is coupled to a display device 110 that includes a touch-screen capability. At step 1112, CPU 102 determines whether a user intends to provide input via the display device 110. In one embodiment, sensor 225 detects that a user's finger 250 is proximate to a surface of the display device 110 configured to receive touch-based input. The sensor 225 senses a distance of the finger 250 from the surface. If the finger 250 is within a threshold distance, then CPU 102 determines that the user intends to provide touch-based input. In another embodiment, sensor 225 tracks the position of the finger 250 and determines a target location 450 associated with the GUI 300. If the target location 450 corresponds to a particular location of the GUI 300, then CPU 102 determines that the user intends to provide touch-based input. A technique for determining the target location is described below in connection with FIG. 12. If CPU 102 determines that a user does not intend to provide touch-based input, then the method waits at step 1112. However, if CPU 102 determines that a user intends to provide touch based input, then method 1100 proceeds to step 1114.

At step 1114, CPU 102 displays one or more touch-based GUI elements on top of GUI 300 on display device 110. In one embodiment, a set of touch-based GUI elements are pre-defined, each touch-based GUI element corresponding to one of the conventional GUI elements of GUI 300. Once CPU 102 determines that the user intends to provide touch based input, CPU 102 causes the set of touch-based elements to be displayed. In some embodiments, a user may manually configure which conventional GUI elements should be associated with a touch-based GUI element in the set of touch-based GUI elements that are displayed. In alternative embodiments, CPU 102 causes a touch-based toolbar 750 to be displayed over GUI 300. The touch-based toolbar 750 corresponds to an expanded version of toolbar 320 of GUI 300. The touch-based toolbar 750 is expanded based on a center of expansion 715 determined from the target location 450 calculated by CPU 102.

At step 1116, CPU 102 determines whether a user intends to provide input via conventional input devices such as keyboard 108 and mouse 109. In one embodiment, CPU 102 determines that a user intends to provide input via conventional input devices when sensor 225 no longer senses that a user's finger 250 is proximate to the display device 110. In another embodiment, CPU 102 may wait until a threshold time has elapsed since sensor 225 last sensed the user's finger 250. In yet another embodiment, CPU 102 determines that a user intends to provide input via conventional input devices when a user begins providing such input by either typing with keyboard 108 or by moving mouse 109. If CPU 102 determines that a user intends to provide input via conventional input devices, then method 1100 proceeds to step 1118 where CPU 102 hides the one or more touch-based GUI elements such that the conventional GUI 300 is displayed on display device 110.

Figure 12:
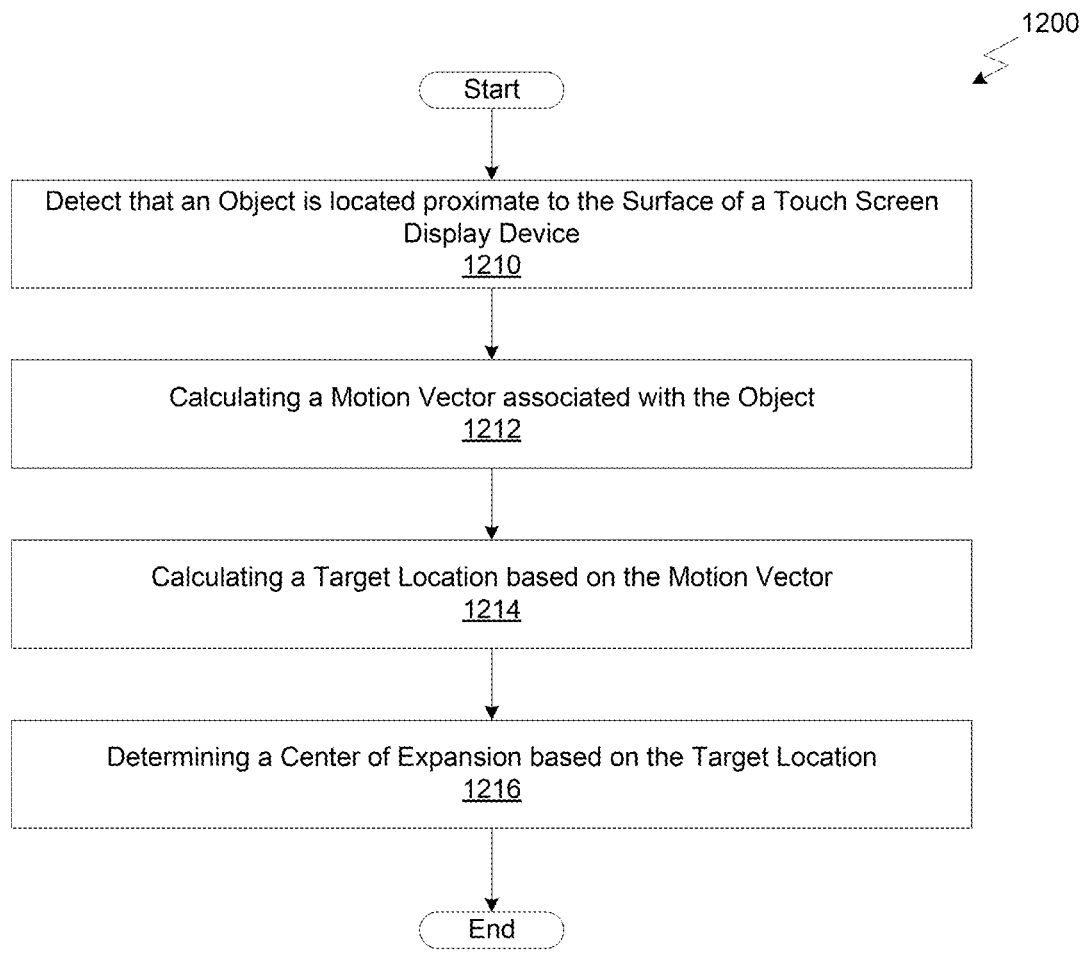
FIG. 12 is a flowchart of method steps for estimating a target location associated with a graphical user interface, according to one example embodiment of the present invention.

FIG. 12 is a flowchart of method steps 1200 for estimating a target location 450 associated with a graphical user interface 300, according to one example embodiment of the present invention. Although the method steps are described in conjunction with the systems of FIGS. 1-10, persons skilled in the art will understand that any system configured to perform the method steps, in any order, is within the scope of the inventions.

The method 1200 begins at step 1210, where CPU 102 detects that an object is located proximate to display device 110. In one embodiment, sensor 225 is configured to sense whenever an object, such as a finger 250, is located proximate to the surface of display device 110. Display device 110 is configured to transmit a signal to CPU 102 that includes information about the location of any object proximate to display device 110. At step 1212, CPU 102 calculates a motion vector 260 associated with the object. In one embodiment, CPU 102 samples positions of an object over time via information received from display device 110 (i.e., sensor 225 of display device 110). Motion vector 260 may be a vector between two or more positions of the object at different points of time.

At step 1214, CPU 102 determines a target location 450 that indicates an estimated location in GUI 300 that the user intends to touch. In one embodiment, target location 450 is based on the intersection of motion vector 260 with the surface of display device 110. At step 1216, CPU 102 determines a center of expansion (715, 815) based on the target location 450. In one embodiment, the center of expansion is the point at the top of toolbar 320 that corresponds to the x-coordinate of the target location 450. In another embodiment, the center of expansion is a point that is defined based on the location of target location 450 within GUI 300. For example, the center of expansion, if the target location 450 is within an edge zone, is located at the top of toolbar 320 at the left edge or right edge of GUI 300.

In sum, the techniques disclosed above provide an efficient technique for providing GUI elements optimized for touch-based input in connection with an application that is designed for conventional input received from a keyboard and a mouse. The touch-based GUI elements are displayed when the computer system detects that a user is about to switch from conventional input devices to touch-sensitive input devices. The touch-based GUI elements are hidden when the user provides input with the conventional input devices such that the touch-based GUI elements do not distract from the application's normal operation.

One advantage of the disclosed technique is that a legacy application does not need to be redesigned to enable the touch-based GUI elements to be implemented for the application. A programmer could build additional functionality into the legacy application or design a separate and distinct application extension that executes in parallel with the legacy application and provides an interface for the touch-based GUI. A further advantage of the disclosed technique is that the touch-based GUI elements are displayed when the user intends to use them and hidden when the user provides input in a manner that is consistent with the original design of the application's GUI. This provides a transparent system that efficiently lets a user switch between two different types of input. For some operations, such as selecting options or scrolling through a document, touch-based input may be more efficient, whereas other operations, such as entering text, may be more efficient using conventional input devices. The system allows both GUIs to be used substantially simultaneously.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for displaying one or more touch-based graphical user interface (GUI) elements, the method comprising:
    executing an application to cause a GUI to be displayed on a touch screen display associated with a computing device, wherein the GUI includes a plurality of conventional GUI elements in a conventional toolbar and configured to interact with at least one of a keyboard or a mouse device;
    detecting a first location of an object that is located proximate to, but not yet in contact with, a surface of the touch screen display, wherein the first location comprises a first x-coordinate, a first y-coordinate, and a first z-coordinate;
    detecting a second location of the object that is located proximate to, but not yet in contact with, the surface of the touch screen display, wherein the second location comprises a second x-coordinate, a second y-coordinate, and a second z-coordinate;
    calculating a motion vector associated with the object based on the first location and the second location, wherein the motion vector indicates a trajectory of the object relative to the surface of the touch screen display;
    calculating a target location of an intersection point of the motion vector with the surface;
    determining a center of expansion for a touch-based toolbar based on the target location, wherein the center of expansion defines an anchor location for the touch-based toolbar relative to the conventional toolbar displayed within the GUI, and wherein the center of expansion is associated with a predefined point for a group of GUI elements within the conventional toolbar;
    determining a first percentage of the one or more touch-based GUI elements to display left of the center of expansion based on a horizontal position of the center of expansion;
    determining a second percentage of the one or more touch-based GUI elements to display right of the center of expansion based on the horizontal position of the center of expansion;
    displaying, based on the target location, the center of expansion, the first percentage, and the second percentage, the one or more touch-based GUI elements on top of the plurality of conventional GUI elements;
    after displaying the one or more touch-based GUI elements, determining that a user intends to provide input to the computing device via the at least one of the keyboard or the mouse device; and
    in response, hiding the one or more touch-based GUI elements,
    wherein each touch-based GUI element included in the one or more touch-based GUI elements is configured to perform a function associated with a different conventional GUI element included in the plurality of conventional GUI elements.

2. The method of claim 1, wherein the one or more touch-based GUI elements are displayed on top of the GUI in response to detecting that the object is within a threshold distance from the surface.

3. The method of claim 1, wherein the first x-coordinate is different than the second x-coordinate, the first y-coordinate is different than the second y-coordinate, and the first z-coordinate is different than the second z-coordinate.

4. The method of claim 1, further comprising detecting a third location of the object that is located proximate to, but not yet in contact with, the surface of the touch screen display, wherein the third location comprises a third x-coordinate, a third y-coordinate, and a third z-coordinate, and wherein the motion vector is calculated based on the first location, the second location, and the third location.

5. The method of claim 1, wherein the touch-based toolbar includes the one or more touch-based GUI elements.

6. The method of claim 1, wherein the center of expansion for the touch-based toolbar is located at the target location.

7. A non-transitory computer-readable storage medium containing a program that, when executed by a processor, performs an operation for displaying one or more touch-based graphical user interface (GUI) elements, the operation comprising:
    executing an application to cause a GUI to be displayed on a touch screen display associated with a computing device, wherein the GUI includes a plurality of conventional GUI elements in a conventional toolbar and configured to interact with at least one of a keyboard or a mouse device;
    detecting a first location of an object that is located proximate to, but not yet in contact with, a surface of the touch screen display, wherein the first location comprises a first x-coordinate, a first y-coordinate, and a first z-coordinate;
    detecting a second location of the object that is located proximate to, but not yet in contact with, the surface of the touch screen display, wherein the second location comprises a second x-coordinate, a second y-coordinate, and a second z-coordinate;
    calculating a motion vector associated with the object based on the first location and the second location, wherein the motion vector indicates a trajectory of the object relative to the surface of the touch screen display;
    calculating a target location of an intersection point of the motion vector with the surface;
    determining a center of expansion for a touch-based toolbar based on the target location, wherein the center of expansion defines an anchor location for the touch-based toolbar relative to the conventional toolbar displayed within the GUI, and wherein the center of expansion is associated with a predefined point for a group of GUI elements within the conventional toolbar;

determining a first percentage of the one or more touch-based GUI elements to display left of the center of expansion based on a horizontal position of the center of expansion;

determining a second percentage of the one or more touch-based GUI elements to display right of the center of expansion based on the horizontal position of the center of expansion;

displaying, based on the target location, the center of expansion, the first percentage, and the second percentage, the one or more touch-based GUI elements on top of the plurality of conventional GUI elements;

after displaying the one or more touch-based GUI elements, determining that a user intends to provide input to the computing device via the at least one of the keyboard or the mouse device; and in response, hiding the one or more touch-based GUI elements, wherein each touch-based GUI element included in the one or more touch-based GUI elements is configured to perform a function associated with a different conventional GUI element included in the plurality of conventional GUI elements.

8. The non-transitory computer-readable storage medium of claim 7, wherein the one or more touch-based GUI elements are displayed on top of the GUI in response to detecting that the object is within a threshold distance from the surface.

9. A system for displaying one or more touch-based graphical user interface (GUI) elements, the system comprising:

a touch screen display;

a memory that includes an application that causes a GUI to be displayed on the touch screen display, wherein the GUI includes a plurality of conventional GUI elements in a conventional toolbar and configured to interact with at least one of a keyboard or a mouse device; and a processor configured to:

detect a first location of an object that is located proximate to, but not yet in contact with, a surface of the touch screen display, wherein the first location comprises a first x-coordinate, a first y-coordinate, and a first z-coordinate;

detect a second location of the object that is located proximate to, but not yet in contact with, the surface of the touch screen display, wherein the second location comprises a second x-coordinate, a second y-coordinate, and a second z-coordinate;

calculate a motion vector associated with the object based on the first location and the second location, wherein the motion vector indicates a trajectory of the object relative to the surface of the touch screen display;

calculate a target location of an intersection point of the motion vector with the surface;

determine a center of expansion for a touch-based toolbar based on the target location, wherein the center of expansion defines an anchor location for the touch-based toolbar relative to the conventional toolbar displayed within the GUI, and wherein the center of expansion is associated with a predefined point for a group of GUI elements within the conventional toolbar;

determine a first percentage of the one or more touch-based GUI elements to display left of the center of expansion based on a horizontal position of the center of expansion;

determine a second percentage of the one or more touch-based GUI elements to display right of the center of expansion based on the horizontal position of the center of expansion;

display, based on the target location, the center of expansion, the first percentage, and the second percentage, the one or more touch-based GUI elements on top of the plurality of conventional GUI elements;

after displaying the one or more touch-based GUI elements, determine that a user intends to provide input to the system via the at least one of the keyboard or the mouse device; and in response, hide the one or more touch-based GUI elements, wherein each touch-based GUI element included in the one or more touch-based GUI elements is configured to perform a function associated with a different conventional GUI element included in the plurality of conventional GUI elements.

10. The system of claim 9, wherein the one or more touch-based GUI elements are displayed on top of the GUI in response to detecting that the object is within a threshold distance from the surface.

* * * * *